United States Patent
Ayers et al.

(10) Patent No.: US 10,075,758 B2
(45) Date of Patent: *Sep. 11, 2018

(54) SYNCHRONIZING AN AUGMENTED REALITY VIDEO STREAM WITH A DISPLAYED VIDEO STREAM

(71) Applicant: International Business Machines Corporation, Armonk, NY (US)

(72) Inventors: Ruth K. Ayers, Malmesbury (GB); Chris Bean, Chandler's Ford (GB); Kevin C. Brown, Chandler's Ford (GB); Giacomo G. Chiarella, Manchester (GB); Alexandra E. Wishart, Coventry (GB); John J. Wood, St. Albans (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,276

(22) Filed: Jan. 17, 2017

(65) Prior Publication Data

US 2017/0127117 A1 May 4, 2017

Related U.S. Application Data

(63) Continuation of application No. 14/685,719, filed on Apr. 14, 2015, now Pat. No. 9,646,421.

(51) Int. Cl.
*G06T 15/20* (2011.01)
*H04N 21/43* (2011.01)
(Continued)

(52) U.S. Cl.
CPC ..... *H04N 21/4307* (2013.01); *G06K 9/00335* (2013.01); *G06K 9/00744* (2013.01);
(Continued)

(58) Field of Classification Search
None
See application file for complete search history.

(56) References Cited

U.S. PATENT DOCUMENTS

| | | |
|---|---|---|
| 2007/0038944 A1 | 2/2007 | Carignano et al. |
| 2010/0220891 A1 | 9/2010 | Lefevre et al. |
| | (Continued) | |

FOREIGN PATENT DOCUMENTS

| | | |
|---|---|---|
| GB | 2539312 A | 12/2016 |
| WO | 2012094605 A1 | 7/2012 |
| WO | 2013176830 A1 | 11/2013 |

OTHER PUBLICATIONS

Curt Cornelis, Augment Reality using Uncaibrated video Sequence, Mar. 17, 2015, pp. 148-161.*

(Continued)

*Primary Examiner* — Cai Chen
(74) *Attorney, Agent, or Firm* — Michael A. Petrocelli (57) ABSTRACT

Synchronizing an augmented reality video stream with a displayed video stream includes: accessing an augmented reality video stream which corresponds to a displayed video stream and accessing synchronizing metadata associated with the augmented reality video stream for synchronizing the augmented reality video stream to the displayed video stream; the synchronizing metadata includes processed key frames of the displayed video stream. Processed key frames are selected frames from the displayed video stream which have been processed to provide data usable to compare images of frames. The displayed video stream is tracked by capturing and processing a frame of the displayed video stream. The augmented reality video stream is synchronized to the displayed video stream by matching the captured and processed frame of the displayed video stream with a (Continued)

processed key frame of the metadata at a known location in the augmented reality video stream.

17 Claims, 7 Drawing Sheets

(51) Int. Cl.
| | |
|---|---|
| *G06T 19/00* | (2011.01) |
| *G06K 9/00* | (2006.01) |
| *H04N 21/81* | (2011.01) |
| *H04N 21/2387* | (2011.01) |
| *G06T 7/70* | (2017.01) |
| *H04N 21/6587* | (2011.01) |

(52) U.S. Cl.
CPC ........... *G06K 9/00758* (2013.01); *G06T 7/70* (2017.01); *G06T 19/006* (2013.01); *H04N 21/2387* (2013.01); *H04N 21/6587* (2013.01); *H04N 21/816* (2013.01); *G06T 2207/30204* (2013.01)

(56) References Cited

U.S. PATENT DOCUMENTS

2012/0113143 A1\* 5/2012 Adhikari ............ G06Q 30/0623
345/633

2012/0127284 A1 5/2012 Bar-Zeev et al.
2014/0059604 A1 2/2014 Kim et al.

OTHER PUBLICATIONS

IBM: List of IBM Patents or Patent Applications Treated as Related (Appendix P), Jan. 17, 2017, pp. 1-2.

Ayers et al., U.S. Appl. No. 14/685,719, filed Apr. 14, 2015, titled "Synchonizing an Augmented Reality Video Stream With a Displayed Video Stream", pp. 1-35.

Total Immersion, "TI Augmented Reality Pro SDK", http://www.t-immersion.com/products/dfusion-suite/dfusion-pro, Accessed on Mar. 27, 2015, pp. 1-2.

BBC, "Piero sports graphics system", Part of the Visual Computing for production work stream, http://www.bbc.co.uk/rd/projects/piero, Accessed on Mar. 27, 2015, pp. 1-4.

BBC, "Augmented Video Player", Part of the Visual Computing for production work stream, http://www.bbc.co.uk/rd/projects/augmented-video-player, Accessed on Mar. 27, 2015, pp. 1-4.

Cornelius et al., "Augmented Reality using Uncalibrated Video Sequences", http://people.inf.ethz.ch/pomarc/pubs/cornelisSMILE2.pdf, captured Mar. 17, 2015, pp. 148-164.

Klein, "Visual Tracking for Augmented Reality", University of Cambridge, Department of Engineering, a thesis submitted for the degree of Doctor of Philosophy, Jan. 2006, pp. 1-182.

UK Combined Search and Examination Report under Sections 17 and 18(3), Application No. GB1606022.0, dated Sep. 30, 2016, pp. 1-5.

\* cited by examiner

SYNCHRONIZING AN AUGMENTED REALITY VIDEO STREAM WITH A DISPLAYED VIDEO STREAM

BACKGROUND

The present invention relates to augmented reality of displayed video streams and more specifically, to synchronizing an augmented reality video stream with a displayed video stream.

Augmented reality (AR) techniques are becoming increasingly popular particularly using handheld devices such as mobile phones and tablets as well as AR glasses.

AR techniques are used to overlay AR video streams including images and information onto displayed video streams. The displayed video stream may be displayed by a separate device, for example in a cinema. Therefore, the AR video stream and the displayed video stream are not linked making it difficult to provide synchronization between the AR video stream and the displayed video stream.

Current AR techniques do not handle video streams very well. The way AR systems work is that they either take an anchor point in a scene by using object recognition to match an object that can be seen to a dictionary of markers, or detect a marker in a scene and determine from the content of the marker the correct media element to display on top of that marker. When using an AR device to look at a video feed that includes changes of scene, the markers will be lost and the device will need to calculate new anchor points at each scene. This does not allow full scale AR overlays onto a video stream, as it is too hard with current technology to use a video feed as a marker.

In addition, a user may be at an angle to the displayed video which may distort the images in the displayed video which provides further challenges when overlaying an AR video stream.

The displayed video stream and an AR video stream may be played with the same speed with the aim of automatically keeping in sync. However, they may get out of sync for two reasons.

Firstly, different devices may have different hardware and software drivers, and this will inevitably lead to some difference over time.

Secondly, when there are separate controls for the displayed video stream and the AR overlay video stream, the AR user might pause/resume etc. and hence the need for further synchronization mechanisms.

Therefore, there is a need in the art to address the aforementioned problems.

BRIEF SUMMARY OF THE INVENTION

According to an aspect of the present invention there is provided a method for synchronizing an augmented reality video stream with a displayed video stream. The method accesses an augmented reality video stream which corresponds to a displayed video stream. The method accesses synchronizing metadata associated with the augmented reality video stream for synchronizing the augmented reality video stream to the displayed video stream. The synchronizing metadata includes processed key frames of the displayed video stream, wherein processed key frames are selected frames from the displayed video stream which have been processed to provide data usable to compare images of frames. The method tracks the displayed video stream by capturing and processing a frame of the displayed video stream, wherein the processing is the same processing as used to generate the processed key frames. The method synchronizes the augmented reality video stream to the displayed video stream by matching the captured and processed frame of the displayed video stream with a processed key frame of the metadata at a known location in the augmented reality video stream, and controls the augmented reality video stream for viewing by a user in association with the displayed video stream.

An aspect of the present invention has the advantage of synchronizing an augmented reality video stream played on an augmented reality device with a displayed video stream without communication of information from the displaying device other than the capture of frames by the augmented reality device of the displayed video stream.

The synchronizing metadata may include a replay speed indication of the displayed video stream. Synchronizing the augmented reality video stream to the displayed video stream may include controlling the speed of the augmented reality video stream by using the replay speed indication. The replay speed indication may be a relay speed between key frames, and controlling the speed of the augmented reality video stream may be by using a relay speed since the last matched key frame.

Providing replay speed metadata allows the augmented reality device to play the augmented reality video stream independently of the displayed video stream whilst maintaining the same replay speed.

The method may further include: identifying location markers in the displayed video stream and accessing associated location marker metadata; using the location markers for one or more of: capturing a correct extent of a frame of the displayed video stream; positioning the augmented reality video stream in relation to the displayed video stream; and determining a direction from which the displayed video stream is viewed.

Location markers enable accurate capture of displayed video stream frames and correct orientation of the augmented reality video stream.

The method may further include detecting if the displayed video stream is paused by: capturing a current frame of the displayed video stream; comparing the captured current frame to a stored previously captured frame; determining that the displayed video stream is paused if the captured current frame and the stored previously captured frame match; and pausing the augmented reality video stream if the displayed video stream is paused. The method may include monitoring the displayed video stream by repeating the above steps to determine if the displayed video stream re-starts. The method may then replace the stored previously captured frame with the captured current frame if no match is found. Detection of pausing during playback enables corresponding control of the augmented reality video stream.

The method may include identifying a marker in the displayed video stream and using the marker to access the augmented reality video stream and the associated synchronization metadata. The method may include using the marker to trigger the playback of the augmented reality video stream.

Processed key frames may be provided at regular intervals in the displayed video stream or in selected places in the displayed video stream. The frequency of the processed key frames may be dependent on the processing capability of an augmented reality device.

The steps of tracking the displayed video stream and synchronizing the augmented reality video stream may be carried out continually through the playback of the displayed video stream. Alternatively, the steps of tracking the displayed video stream and synchronizing the augmented reality video stream may be carried out to re-calibrate synchronization of the augmented reality video stream.

The method may further include: generating metadata for use with an augmented reality video stream for a video stream to be displayed including: selecting key frames of the video stream to be displayed; processing the key frames wherein the processing provides data usable to compare images of frames; and referencing a corresponding location of the key frames in the augmented reality video stream. Generating metadata may include determining a playback speed of the video stream to be displayed between key frames and adding a replay speed indication to the metadata. Generating metadata may include metadata relating to the relationship of the augmented reality video stream to provided location markers of the displayed video stream.

According to a further aspect of the present invention there is provided a system for synchronizing an augmented reality video stream with a displayed video stream. The system may include a computer device having a processor and a tangible storage device, and a program embodied on the storage device for execution by the processor. The program may have one or more program instructions. The system may further include an augmented reality video stream display having access to an augmented reality video stream which corresponds to a displayed video stream; a metadata accessing component for accessing synchronizing metadata associated with the augmented reality video stream for synchronizing the augmented reality video stream to the displayed video stream, wherein the synchronizing metadata includes processed key frames of the displayed video stream, wherein processed key frames are selected frames from the displayed video stream which have been processed to provide data usable to compare images of frames; a tracking component for tracking the displayed video stream by capturing and processing a frame of the displayed video stream, wherein the processing is the same processing as used to generate the processed key frames; and a synchronizing component for synchronizing the augmented reality video stream to the displayed video stream including a matching component for matching the captured and processed frame of the displayed video stream with a processed key frame of the metadata at a known location in the augmented reality video stream; and wherein the an augmented reality video stream display controls the synchronized augmented reality video stream for viewing by a user in association with the displayed video stream.

The synchronizing metadata may include a replay speed indication of the displayed video stream; and wherein the synchronizing component may include a speed controlling component for controlling the speed of the augmented reality video stream by using the replay speed indication.

The system may include a video location component for identifying location markers in the displayed video stream and accessing associated location marker metadata; and using the location markers for one or more of: capturing a correct extent of a frame of the displayed video stream by the capturing component; positioning the augmented reality video stream in relation to the displayed video stream; and determining a direction from which the displayed video stream is viewed.

The system may further include a pause detection component for detecting if the displayed video stream is paused including: a comparing component for comparing a captured current frame to a stored previously captured frame.

The system may include a start marker component for identifying a marker in the displayed video stream and using the marker to access the augmented reality video stream and the associated synchronization metadata.

The system may further include a metadata generating component for generating metadata for use with an augmented reality video stream for a video stream to be displayed including: selecting key frames of the video stream to be displayed; processing the key frames wherein the processing provides data usable to compare images of frames; and referencing a corresponding location of the key frames in the augmented reality video stream.

According to a further aspect of the present invention there is provided a method substantially as described with reference to the figures.

According to a further aspect of the present invention there is provided a system substantially as described with reference to the figures.

The described aspects of the invention provide the advantage of improving synchronization between a displayed video stream and an AR video stream particularly when the displayed video stream is provided by another device and not linked to the AR device.

The described solution modifies the AR pipeline in order to use an anchor based on time as well as vision. This would include small modifications to the video stream to enable the AR device to work.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

An AR device may be provided as a computing device which overlays an AR video stream on to a displayed video stream. The displayed video stream may be provided by a different displaying device; for example, in a cinema, presentation, television, video game, etc. The AR device may be a handheld device such as a mobile phone or tablet, or a readable device, such as glasses which can view the displayed video stream. The viewing may be through a camera provided by the AR device.

A method and system are described for synchronizing an AR video stream played on an AR device with a displayed video stream.

Preparation of the video stream for display may be carried out including generating metadata to be provided to a user with the AR video stream. The metadata may be generated by selecting key frames at regular intervals throughout the video stream and processing the key frames to provide a processed form which can be used to compare images. The processed key frames are referenced to their corresponding location in the AR video stream. The metadata may also include a record of the playback speed of the video stream and/or the time between key frames. The processed key frames may be provided in a dictionary.

Additional preparation of the video stream for display may provide location markers in the display to indicate to the AR device the extent or boarder of the video display. For example, the markers may be provided on the edge of the displayed video. Alternatively, the markers may be provided on the display screen itself, which may be used for any displayed video stream. Additional metadata may be provided in relation to the AR video stream relating to the positioning of the AR video stream in relation to the displayed video stream using the markers.

While watching a displayed video stream, the AR device may use a camera to detect and capture what is on the display screen. It may use a predefined processing algorithm specified for the displayed video stream to process captured frames from the displayed video stream. The processed captured frames are used to look up processed key frames in a metadata dictionary provided with the AR video stream for the displayed video stream. Matching to a processed key frame in the dictionary enables the AR device to know where in the displayed video stream the playback is and find the corresponding place in the AR video stream.

There is no link between the AR device and the running displayed video stream. If the running video is stopped, the local AR device will detect this through the camera and overlay the appropriate video at that position.

To enhance this, as well as using the key frame lookup dictionary, the frame rate may provide a time between key frames that may be used to keep the AR video stream in synchronization with the displayed video stream.

Figure 1:
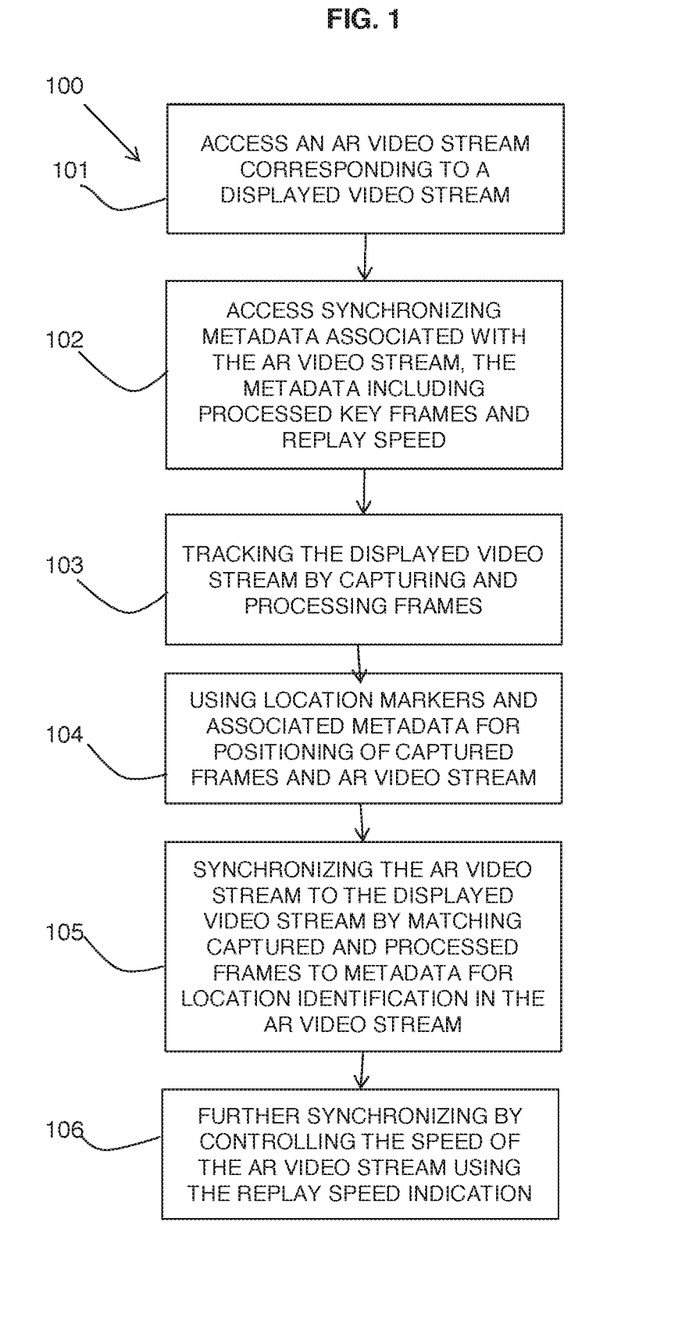
FIG. 1 is a flow diagram of an example embodiment of a method in accordance with the present invention.

FIG. 1 shows a flow diagram 100 of an example embodiment of the described method as carried out at a device having AR capabilities.

An augmented reality video stream which corresponds to a displayed video stream is accessed (step 101). This may be by downloading the AR video stream and storing this locally on the AR device. Alternatively, the AR video stream may be streamed from a remote server via a fast network with sufficient caching at the AR device.

Synchronizing metadata associated with the AR video stream for synchronizing the AR video stream to the displayed video stream is accessed (step 102). The metadata may be downloaded and stored at the AR device with reference to AR video stream to which it corresponds. Alternatively, the metadata may be provided remotely over a network with suitable caching to be responsive to changes in the displayed video stream.

The synchronizing metadata may include processed key frames of the displayed video stream together with their location in the AR video stream and a replay speed indication of the displayed video stream. Additional metadata may also be provided such as metadata relating to the relationship of positioning markers as described further below.

The processed key frames may be key frames of the video stream to be displayed which are processed to provide an identification of the image of the key frame. The key frames may be spaced uniformly in the video stream or at selected parts. The key frames may be spaced evenly or not evenly in the video stream. The closer together they are placed, the more accurately the overlay is likely to be placed but the larger the dictionary will become, and potentially more processing will be done. Therefore, practical implementations of a system will provide a basis for the best configurations for the likely target devices.

The processing of the key frames may be by applying a hash algorithm to the image of the key frame. Hashing reduces a large amount of data to a fixed smaller size and may be used to identify an image. Hashing may not work well in situations where the AR user is at a different angle to the displayed video stream.

More comprehensive algorithms may be used such as peak signal-to-noise ratio (PSNR) or structural similarity (SSIM) which provide a measure of how similar given pixels are in an image.

PSNR is used to measure the quality of reconstruction of lossy compression codecs for image compression. The signal in this case is the original data and the noise is the error introduced by compression.

SSIM is a method for measuring the similarity between two images and considers image degradation as perceived change in structural information. Structural information is the idea that the pixels have strong inter-dependencies especially when they are spatially close and these dependencies carry important information about the structure of the objects in a visual scene.

The processed key frames may be designated portions of a frame (for example, a vertical strip of the frame) instead of the entire frame of the display. This may reduce the processing required but may also be less accurate.

The processed key frame metadata which is at known locations in the AR video stream is used to synchronize the AR video stream to the displayed video stream during playing of the displayed video stream. This is achieved by tracking (step 103) the displayed video stream by capturing and processing frames of the displayed video stream using the AR device. For example, a camera of the AR device may be used to capture frames of the displayed video stream. The captured frames are processed using the same form of processing as used to generate the metadata key frames. The captured frames may be captured at regular intervals to keep the AR video stream synchronized with the displayed video stream, or may be used when there are no current anchor points.

The frames may be captured at every frame if the AR device was powerful enough. Practically it would probably be less, but then it would mean some frames which do have an entry in the dictionary might be missed, making the synchronization less effective. As devices become more powerful in the future it will mean the AR device can perform this calculation more often, but in real terms it would probably be determined programmatically depending on how much spare time is left in the time-step after higher priority calculations.

To ensure the AR device is only processing the displayed video stream and not, for example, part of a cinema wall, and to ensure the displayed video stream is displayed at the correct angle for the viewer, location markers may also be provided and used (step 104) in a known position in relation to the display screen which are captured and referenced to additional metadata in relation to the AR video stream. The location markers may be used for determining an area of the displayed video stream to capture for processing. The location markers may also be used to instruct the correct positioning of the AR video stream in relation to the displayed video stream. If the AR device processed everything the camera could see, then the same displayed video stream in different settings and viewed from different distances or angles, would not work.

The AR video stream is then synchronized (step 105) to the displayed video by matching captured and processed frames of the displayed video stream with the processed key frames of the metadata. The metadata indicates a reference point for where in the AR video stream the current captured frame is.

The AR video stream may also be synchronized (step 106) to the displayed video by controlling the speed of the AR video stream by using the replay speed indication in the metadata. The replay speed indication may take the form of a frame per second (FPS) rate for displayed video stream at which the AR video stream should also be played. Alternatively or additionally, there may be a time between key frames provided in the metadata to enable corresponding playback between the key frames.

The AR device may then output the synchronized AR video stream for viewing by a user in association with the displayed video stream. The synchronization using the above method may be continually tracked and synchronized during playback of the displayed video stream. Alternatively, the synchronization may be activated if the tracking is lost.

In addition, at the initialization of the displayed video stream, it may display a slide with a unique marker that corresponds to the AR video stream that may be provided in a dictionary. This dictionary entry may contain the metadata for the displayed video stream and the unique marker may therefore act as a look-up reference to the metadata.

The end of the unique marker may trigger the AR device to begin playing the AR video stream as an overlay to the displayed video stream, which may operate in the same way that a conventional AR overlay would work.

Figure 2:
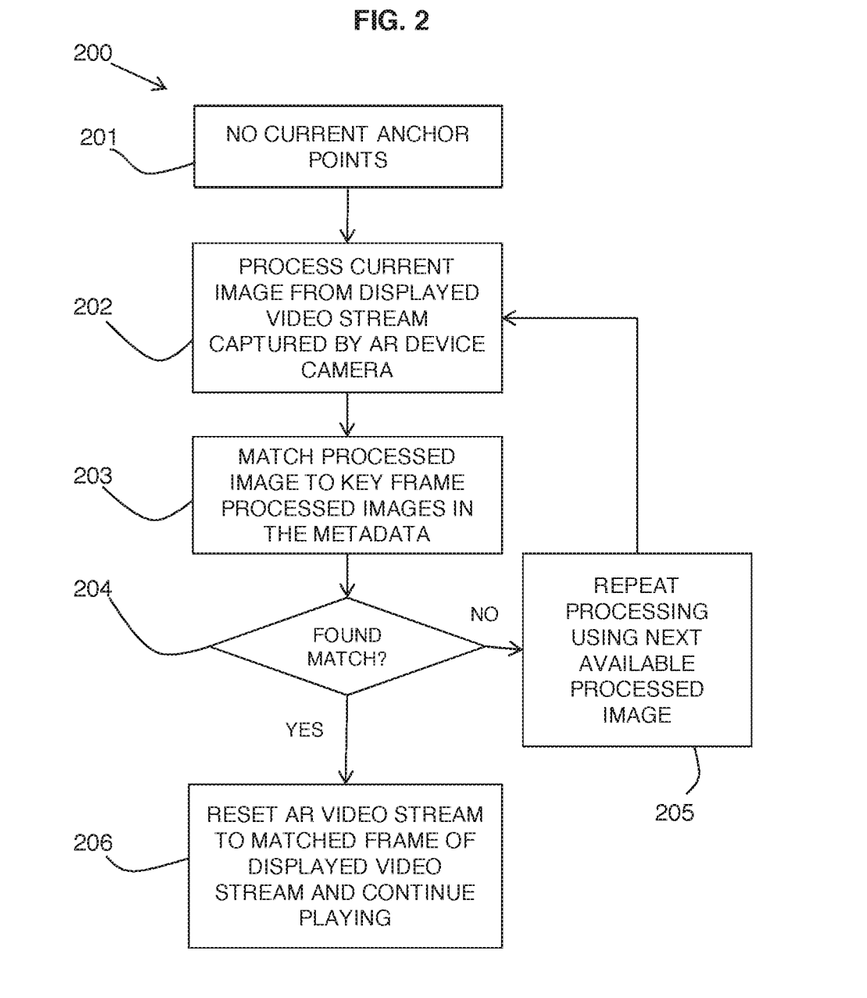
FIG. 2 is a flow diagram of an example embodiment of a method in accordance with an aspect of the present invention.

Referring to FIG. 2, a flow diagram 200 shows an example embodiment of an aspect of the described method.

If the user were to skip forward or backwards in the displayed video stream or pause the playback, the chronological sequence of the AR video stream may be wrong and de-synchronization of the AR video stream may occur. Re-calibration may then be required. This may be solved by using the concept of the processed key frames to quickly identify the current point of the displayed video stream.

There may be key frames evenly spaced throughout the displayed video stream every few frames which are all processed and added to the metadata. When there are no current anchor points in the scene (step 201), the AR device may capture and process (step 202) each incoming image from the video stream and try to match it (step 203) to the total set of processed key images stored in the metadata of the markers dictionary entry.

If no match is found (step 204), the next image is captured and processed (steps 205 and 202) and a match searched for. As not all frames by only key frames are processed and stored in the metadata, it may require a few consecutive frames to be captured before a match is found.

When a match is found (step 204), the system has a reference point for where it is in the incoming displayed video stream and resets (step 206) the AR video stream to that point in time.

In order to effectively use the displayed video stream as a marker to position the AR overlay video stream against, each key frame is used as a marker in the system. At x point in time the AR device will expect keyframe[x] as a marker, which allows it to detect the image in the scene and then run markerless positioning algorithms against it to display the AR device correctly.

Figure 3:
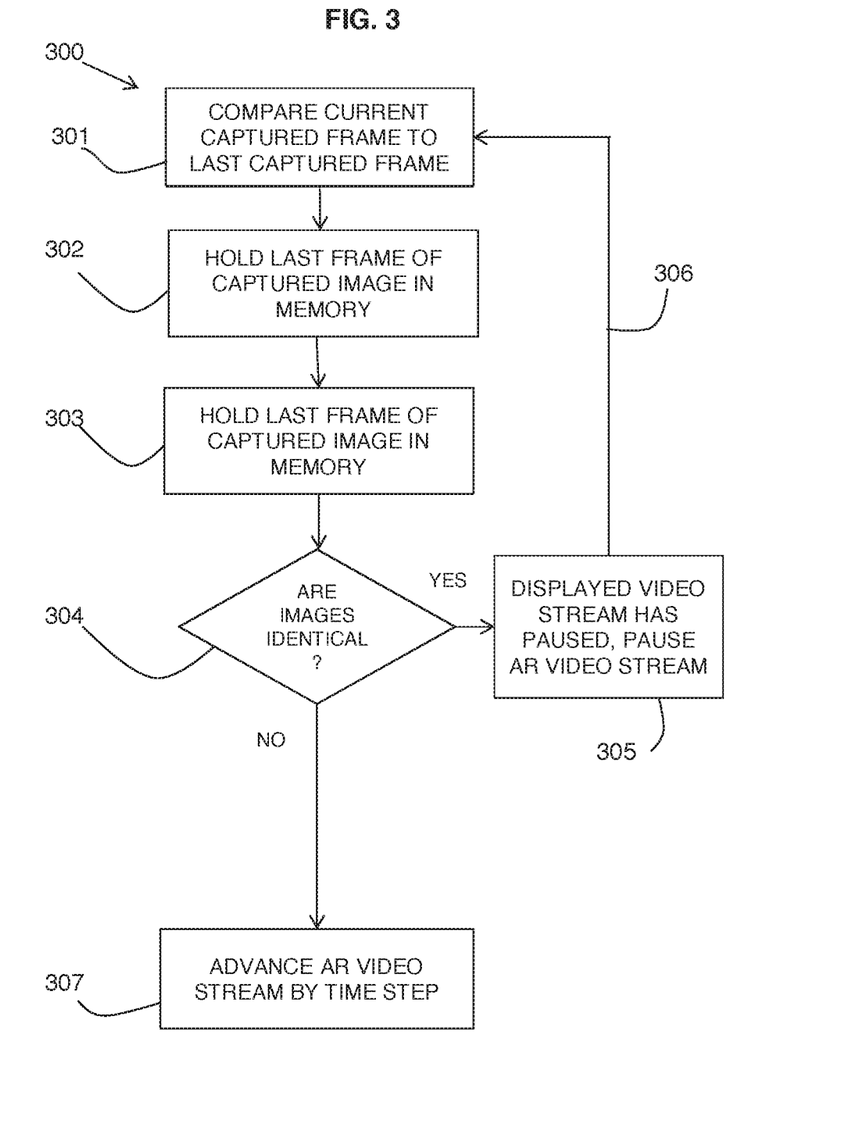
FIG. 3 is a flow diagram of another example embodiment of a method in accordance with an aspect of the present invention.

Referring to FIG. 3, a flow diagram 300 shows an additional aspect of the described method of determining if the displayed video is paused or stopped. As the synchronization is based on a chronological sequence of events, it may be disrupted by a user pausing the video stream. This can be overcome by assuming that in each frame captured by the camera on board the AR device, the image on the displayed video stream being captured will have changed, even very slightly.

A most recently captured frame of the displayed video stream is held (step 301) in memory. When a next frame of the displayed video stream is captured (step 302) by the AR device this is compared (step 303) to the frame held in memory.

It may be determined (step 304) if the images are identical. If so, the displayed video stream has been paused and the AR video stream is also paused (step 305). The method may loop (step 306) to determine when the displayed video stream starts to play again by determining that the images are no longer identical.

If the images are not identical, as the FPS of the displayed video stream is known, the AR video stream may be advanced (step 307) by the same time step.

An additional aspect is now described relating to the use of location markers. Location markers may be provided either in the displayed video stream or on the displaying device. The metadata provided in relation to the AR video stream may include metadata relating to the relationship of the AR video stream to the location markers.

For example, if there are 4 markers around the edge of the cinema screen, marker 1 at top-left, marker 2 at top-right, marker 3 at bottom-left, marker 4 at bottom-right, the marker identifier and the relative location to the AR video stream would need to be provided. When the camera on the AR device detects marker 1, it would know to place the left edge of the AR video stream directly to the right of that marker. When it detects marker 2, it would know that it should place the right hand edge to the left of the marker, and so on.

In playback of the AR video stream these location markers may be detected and used for two purposes: (a) which bit of the camera view it should process when comparing with the key frames in the dictionary; and (b) which bit of the AR device's display to place the overlaid displayed video. Finally, these markers help identify from what angle the displayed video stream is being viewed from. If the marker 2 is higher than marker 1 and marker 4 is lower than marker 3, for example, the screen is being looked at from the left-hand side.

Figure 4A:
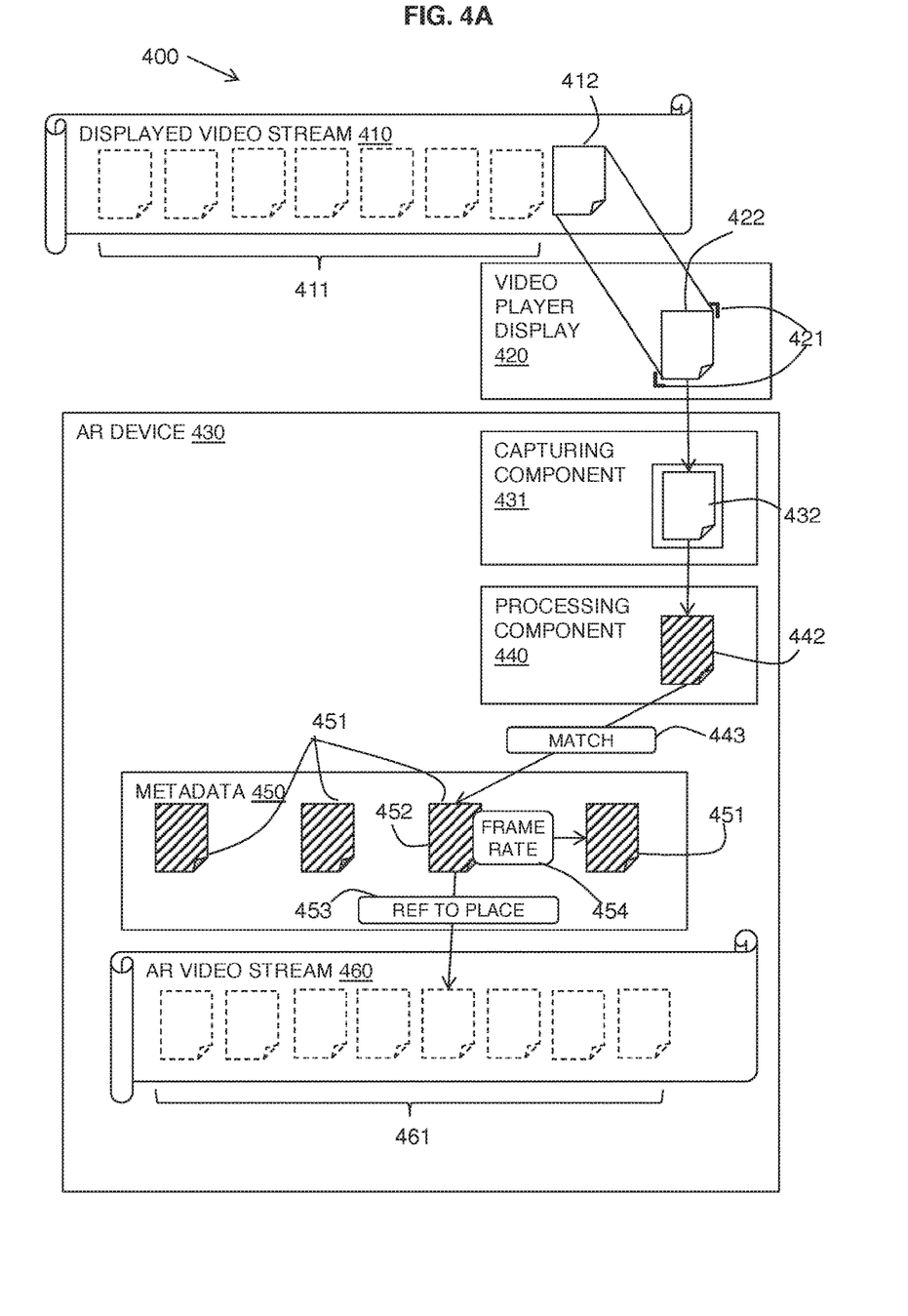
FIG. 4A is a schematic diagram of an example embodiment a method in accordance with an aspect of the present invention.

Referring to FIG. 4A, a schematic diagram 400 shows an aspect of the described method and system.

FIG. 4A shows a displayed video stream 410 which is formed of a series of frames 411 which are played at a rate of frames per second. The frame rate may vary during playback due to variations in the playing device. A video player display 420 is shown on which the displayed video stream 410 is displayed.

The diagram in FIG. 4A shows a current frame 412 of the displayed video stream 410 which is shown on the video player display 420 as a displayed current frame 422. The video player display 420 may have markers 421 defining the boundary of the displayed current frame 422 which may be used by the AR device 430 when capturing frames.

An AR device 430 may include a capturing component 431, for example, a camera of the AR device 430 which may also be the viewing means of the AR device 430. The capturing component 431 may capture the displayed current frame 422 as a captured image 432. A processing component 440 of the AR device 430 may process the captured image 432 to obtain a processed captured image 442. The processing may be by one of various methods to obtain an identification of the image of the key frame which is capable of being compared to processed forms of other images.

Metadata 450 of the displayed video stream 410 is provided to the AR device 430 and includes a series of processed key frames 451. The key frames may have been selected from regularly spaced frames of the displayed video stream 410. The metadata 450 includes references 453 for each processed key frame 451 to a location in an AR video stream 460 corresponding to the displayed video stream 410. The AR video stream 460 may also be made up of frames 461. The reference 453 to the location may be a timestamp in the playback of the AR video stream 460. The metadata 450 may also include a frame rate 454 between adjacent key frames. The metadata 450 may be provided to the AR device 430 at a registration or loading stage together with the AR video stream 460.

The processed captured image 442 may be compared to the processed key frames 451 of the metadata and a match 443 may be found with a matched processed key frame 452. The matched processed key frame 452 may be used to provide a reference 453 to a current location in the AR video stream 460 and the frame rate 454 between the matched processed key frame 452 and the next key frame may be used to play the AR video stream 460 from the location 453 at the correct playback speed.

The described method may be used to keep the AR video stream 460 in synchronization with the displayed video stream 410 and may also or alternatively be used to find a current location in the AR video stream 460 if this is lost.

Figure 4B:
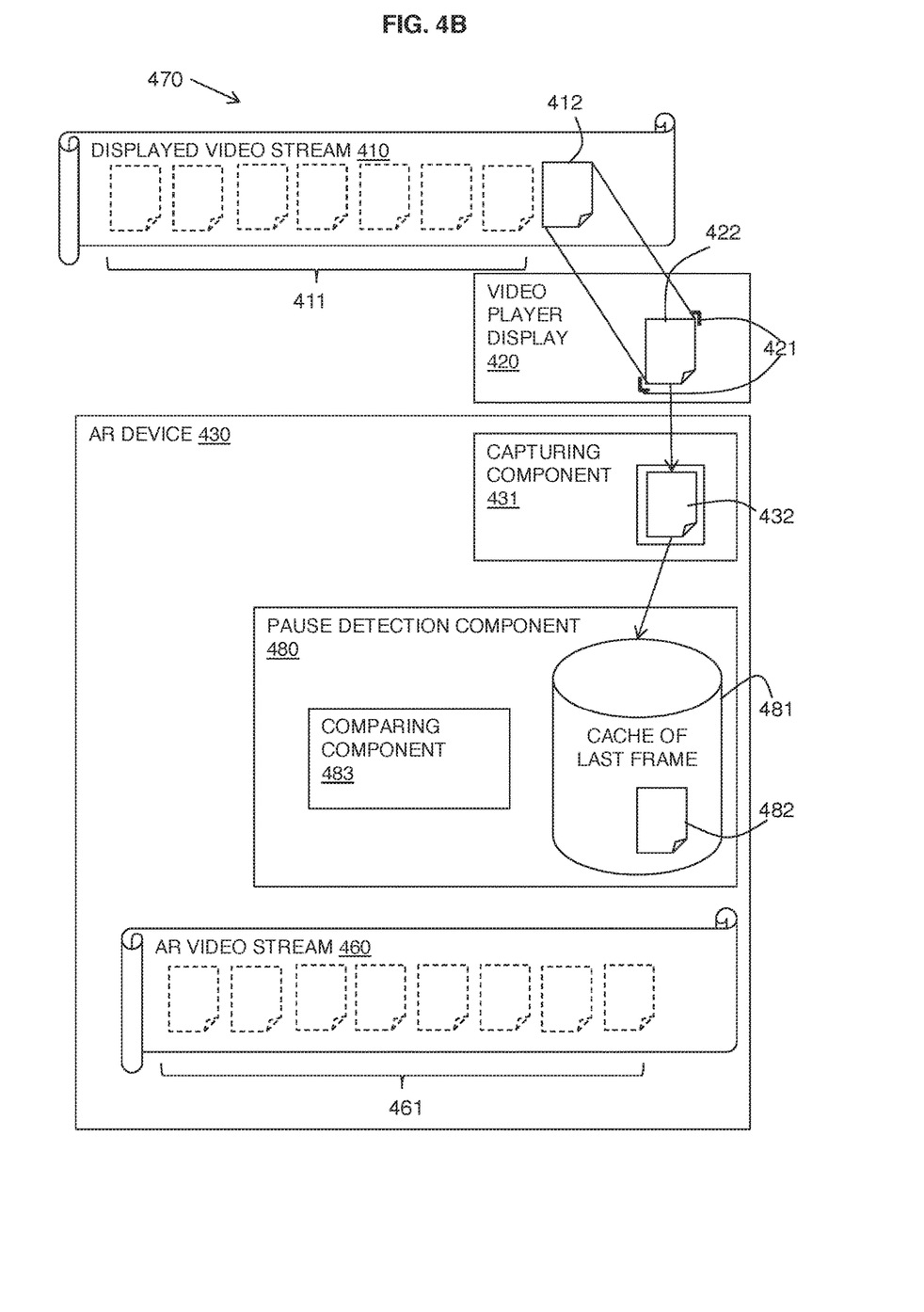
FIG. 4B is a schematic diagram of another example embodiment a method in accordance with an aspect of the present invention.

Referring to FIG. 4B, a schematic diagram 470 shows another aspect of the described method and system.

As in FIG. 4A, FIG. 4B shows a displayed video stream 410 which is formed of a series of frames 411 which are played at a rate of frames per second. A video player display 420 is shown on which the displayed video stream 410 is displayed.

As in FIG. 4A, FIG. 4B shows a current frame 412 of the displayed video stream 410 which is shown on the video player display 420 as a displayed current frame 422. The video player display 420 may have markers 421 defining the boundary of the displayed current frame 422 which may be used by the AR device 430 when capturing frames.

An AR device 430 may include a capturing component 431, for example, a camera of the AR device 430 which may also be the viewing means of the AR device 430. The capturing component 431 may capture the displayed current frame 422 as a captured image 432.

In the aspect shown in FIG. 4B, a pause detection component 480 is shown which includes a cache 481 of the previously captured frame image 482. A comparing component 483 may compare the captured image 432 with the previously captured frame image 482. If the images are identical, then the displayed video stream 410 has been paused or stopped and the AR device 430 may pause or stop the AR video stream 460 at the same time.

The comparing component 483 may process the captured frame image 482 and may compare it to a processed previously captured frame image 482 which has been stored in the cache 481.

Figure 5:
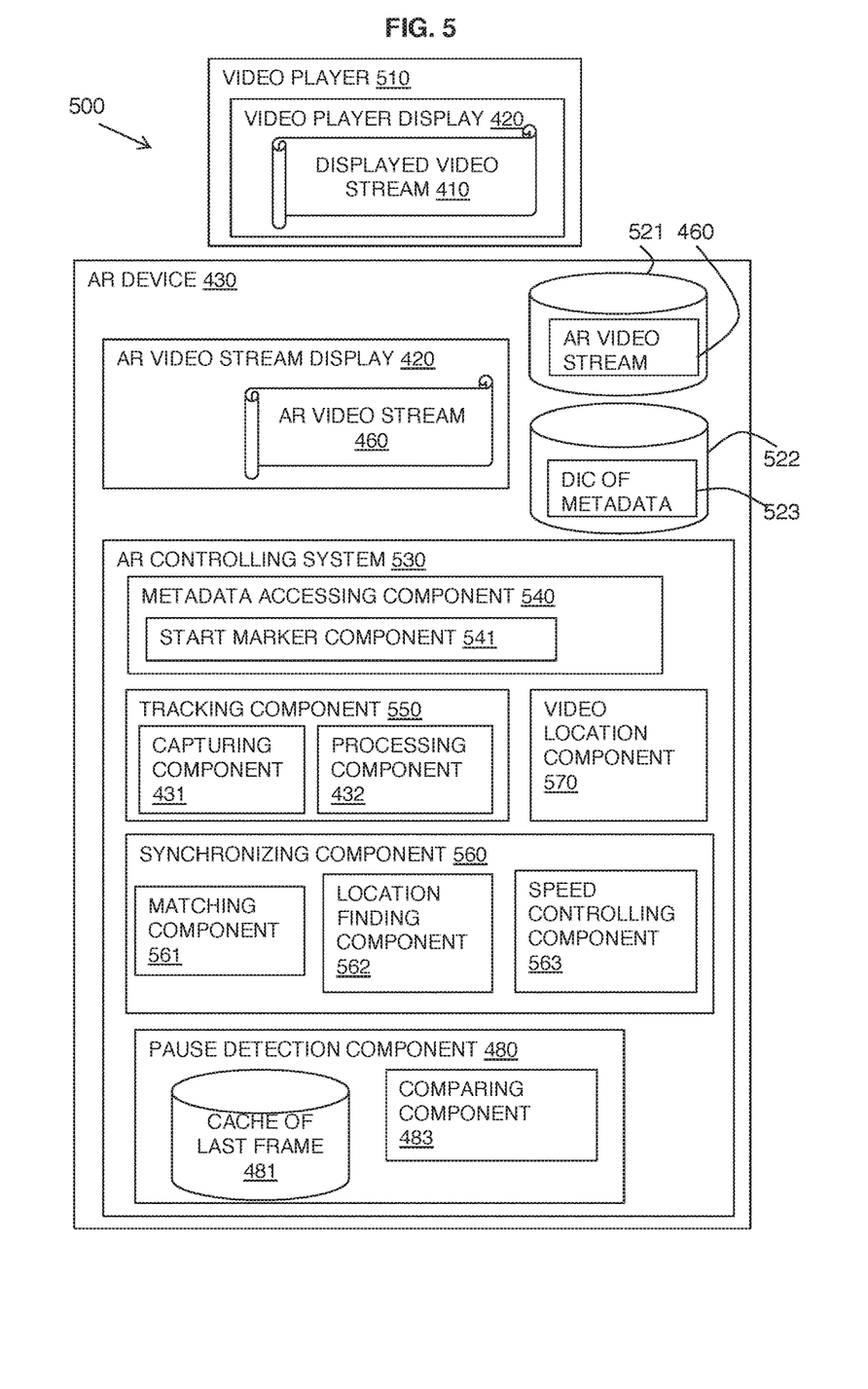
FIG. 5 is block diagram of an example embodiment of a system in accordance with the present invention.

Referring to FIG. 5, a block diagram 500 shows an embodiment of the described system. The same references numbers are used from FIGS. 4A and 4B where appropriate.

A video player 510 may be provided with a video player display 420 on which the displayed video stream 410 may be played. The video player 510 may take various forms, including a cinema film player, a television, a gaming console, etc.

A separate AR device 430 may be an individual device of a user. Alternatively, the AR device 430 may be a device for viewing by multiple people, such as when broadcasting a displayed video stream with an AR overlay. For example, this may be used when explaining tactics in a sports match or as an educational aid.

The AR device 430 may include an AR video display interface 520 for displaying an AR video steam 460. Storage devices 521, 522 may store downloaded AR video streams 460 and a dictionary of metadata 523 for use with the AR video stream 460.

The AR device 430 may include an AR controlling system 530. The AR controlling system 530 may include a metadata accessing component 540 for accessing the stored metadata in the dictionary of metadata 523 provided for an AR video stream 460. The metadata accessing component 540 may include a start marker component 541 for identifying a marker in the displayed video stream 410 and looking up the dictionary of metadata 523 to access the metadata and start the AR video stream 460 in synchronization with the displayed video stream 410.

The AR controlling system 530 may also include a tracking component 550 including a capturing component 431 for capturing a current frame as an image from the displayed video stream 410 and a processing component 432 for processing captured images.

The AR controlling system 530 may include a video location component 570 for identifying location markers in the displayed video stream 410 or on the video player display 420 and using the location markers and associated metadata provided for the location markers to capture a correct extent of frames and correctly position the AR video stream 460.

The AR controlling system 530 may also include a synchronizing component 560 including a matching component 561 for matching a captured and processed current frame to the processed key frames stored in the dictionary of metadata 523. A location finding component 562 may use the location references in the metadata to find a current location in the AR video stream 460 and a speed controlling component 563 may use the frame rate between key frames of the metadata for controlling the playback speed of the AR video stream 460.

The AR controlling system 530 may also include a pause detection component 480 for detecting when a playback of the displayed video stream 410 is paused or stopped. The pause detection component 480 may include a cache of last frame 481 and a comparing component 483 to compare a currently captured frame with the last cached frame.

An advantage of the described method and system is that it allows the overlay of an augmented reality stream onto a video feed, accounting for user interactions with the video without tethering the device displaying the video to the AR device.

The above may be described as a "marker based" solution, as the key frames may be regarded as markers in this context. This is augmented by the "markerless" solution of using time since key frame, and therefore improves the solution accuracy.

Figure 6:
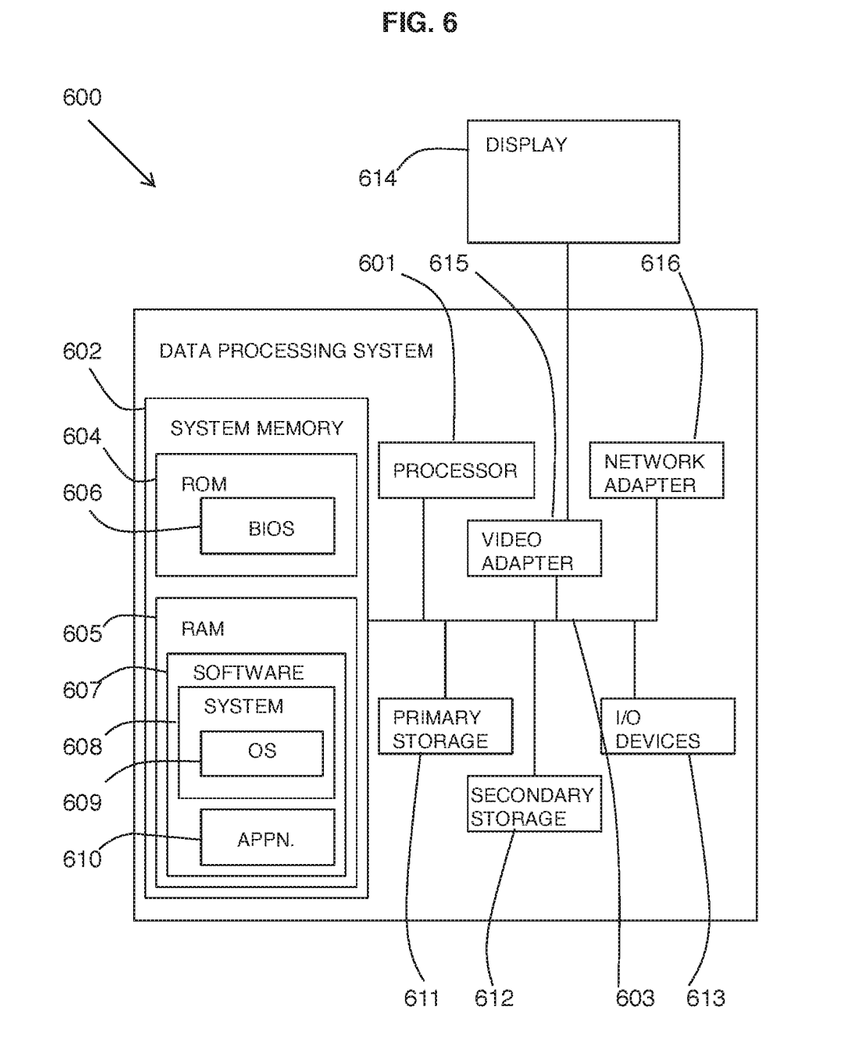
FIG. 6 is a block diagram of an embodiment of a computer system in which the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 may be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The prior art has the technical problem of the difficulty of synchronizing a displayed video stream and an AR video stream played on a separate device.

The described method and system provide technical features to solve this problem in the form of synchronization features for coordinating between a displayed video stream and an AR video stream. The synchronization features involve the provision of metadata generated from and relating to the displayed video stream which is stored by an AR device for use during playback of an AR video stream. The AR device captures frames of the viewed displayed video stream using a camera or scanner of the AR device and processes these frames with reference to the metadata. The AR device may then control the playback of the AR video stream by capturing and processing frames of the displayed video stream.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for synchronizing an augmented reality video stream with a displayed video stream, comprising:
  accessing an augmented reality video stream which corresponds to a displayed video stream;
  accessing synchronizing metadata associated with the augmented reality video stream for synchronizing the augmented reality video stream to the displayed video stream, wherein the synchronizing metadata includes processed key frames of the displayed video stream and a replay speed indication of the displayed video stream, wherein processed key frames are selected frames from the displayed video stream which have been processed to provide data usable to compare images of frames;
  tracking the displayed video stream by capturing and processing a frame of the displayed video stream, wherein the processing is the same processing as used to generate the processed key frames; and
  synchronizing the augmented reality video stream to the displayed video stream by matching the captured and processed frame of the displayed video stream with a processed key frame of the metadata at a known location in the augmented reality video stream, and wherein synchronizing the augmented reality video stream to the displayed video stream includes controlling the speed of the augmented reality video stream by using the replay speed indication.

2. The method as claimed in claim 1, wherein the replay speed indication is a relay speed between key frames, and controlling the speed of the augmented reality video stream is by using a relay speed since the last matched key frame.

3. The method as claimed in claim 1, including:
  identifying location markers in the displayed video stream and accessing associated location marker metadata;
  using the location markers for one or more of:
  capturing a correct extent of a frame of the displayed video stream;
  positioning the augmented reality video stream in relation to the displayed video stream; and
  determining a direction from which the displayed video stream is viewed.

4. The method as claimed in claim 1, including monitoring the status of the displayed video stream by:
  capturing a first frame of the displayed video stream;
  storing the first captured frame of the displayed video stream in a computer memory device;
  capturing a second frame of the displayed video stream;
  comparing the first captured frame to the second captured frame;
  determining that the displayed video stream is paused if the first captured current frame and the second captured frame match, and pausing the augmented reality video stream; and determining that the displayed video stream is live if the first captured current frame and the second captured frame do not match, and advancing the augmented reality video stream.

5. The method as claimed in claim 4, including replacing the stored first captured frame with the second captured current frame if no match is found.

6. The method as claimed in claim 1, including:
identifying a marker in the displayed video stream and using the marker to access the augmented reality video stream and the associated synchronization metadata.

7. The method as claimed in claim 6, including using the marker to trigger the playback of the augmented reality video stream.

8. The method as claimed in claim 1, wherein processed key frames are provided at regular intervals in the displayed video stream.

9. The method as claimed in claim 1, wherein tracking the displayed video stream and synchronizing the augmented reality video stream is carried out continually through the playback of the displayed video stream.

10. The method as claimed in claim 1, wherein tracking the displayed video stream and synchronizing the augmented reality video stream is carried out to re-calibrate synchronization of the augmented reality video stream.

11. The method as claimed in claim 1, including:
generating metadata for use with an augmented reality video stream for a video stream to be displayed including:
selecting key frames of the video stream to be displayed;
processing the key frames wherein the processing provides data usable to compare images of frames; and
referencing a corresponding location of the key frames in the augmented reality video stream.

12. The method as claimed in claim 11, wherein generating metadata includes determining a playback speed of the video stream to be displayed between key frames and adding a replay speed indication to the metadata.

13. The method as claimed in claim 11, wherein generating metadata includes metadata relating to the relationship of the augmented reality video stream to provided location markers of the displayed video stream.

14. A system for synchronizing an augmented reality video stream with a displayed video stream, comprising:
a processor and a tangible storage device, and a program embodied on the storage device, the program having instructions for execution by the processor; and
an augmented reality video stream display having access to an augmented reality video stream which corresponds to a displayed video stream;
wherein the program instructions comprise instructions to:
access synchronizing metadata associated with the augmented reality video stream for synchronizing the augmented reality video stream to the displayed video stream, wherein the synchronizing metadata includes processed key frames of the displayed video stream and a replay speed indication of the displayed video stream, wherein processed key frames are selected frames from the displayed video stream which have been processed to provide data usable to compare images of frames;
track the displayed video stream by capturing and processing a frame of the displayed video stream, wherein the processing is the same processing as used to generate the processed key frames; and
synchronize the augmented reality video stream to the displayed video stream including a matching component for matching the captured and processed frame of the displayed video stream with a processed key frame of the metadata at a known location in the augmented reality video stream, and synchronize the augmented reality video stream to the displayed video stream including a speed controlling component for controlling the speed of the augmented reality video stream by using the replay speed indication.

15. The system as claimed in claim 14, wherein the program instructions further comprise instructions to identify location markers in the displayed video stream and access associated location marker metadata; and instructions to use the location markers for one or more of: capturing a correct extent of a frame of the displayed video stream by the capturing component; positioning the augmented reality video stream in relation to the displayed video stream; and determining a direction from which the displayed video stream is viewed.

16. The system as claimed in claim 14, wherein the program instructions further comprise instructions to detecting if the displayed video stream is paused based on comparing a captured current frame to a stored previously captured frame.

17. A computer program product for synchronizing an augmented reality video stream with a displayed video stream, the computer program product comprising a non-transitory computer readable storage medium having program instructions embodied therewith, the program instructions executable by a processor to cause an augmented reality device to:
access an augmented reality video stream which corresponds to a displayed video stream;
access synchronizing metadata associated with the augmented reality video stream for synchronizing the augmented reality video stream to the displayed video stream, wherein the synchronizing metadata includes processed key frames of the displayed video stream and a replay speed indication of the displayed video stream, wherein processed key frames are selected frames from the displayed video stream which have been processed to provide data usable to compare images of frames;
track the displayed video stream by capturing and processing a frame of the displayed video stream, wherein the processing is the same processing as used to generate the processed key frames;
synchronize the augmented reality video stream to the displayed video stream by matching the captured and processed frame of the displayed video stream with a processed key frame of the metadata at a known location in the augmented reality video stream, and synchronize the augmented reality video stream to the displayed video stream by controlling the speed of the augmented reality video stream using the replay speed indication.

* * * * *